United States Patent
Mori et al.

[11] Patent Number: 6,152,849
[45] Date of Patent: Nov. 28, 2000

[54] FRICTION ROLLER TYPE CONTINUOUSLY VARIABLE TRANSMISSION

[75] Inventors: Haruhito Mori, Kawasaki; Masaki Nakano, Yokohama; Jun Sugihara, Kanagawa, all of Japan

[73] Assignee: Nissan Motor Co., Ltd., Yokohama, Japan

[21] Appl. No.: 09/236,831

[22] Filed: Jan. 25, 1999

[30] Foreign Application Priority Data

Jan. 29, 1998 [JP] Japan ................................. 10-16622

[51] Int. Cl.[7] .................................................. F16H 15/38
[52] U.S. Cl. ........................... 476/10; 403/356; 476/40
[58] Field of Search ........................ 476/10, 40, 42; 403/355, 356

[56] References Cited

U.S. PATENT DOCUMENTS

| | | | |
|---|---|---|---|
| 4,905,529 | 3/1990 | Nakano | 74/201 |
| 4,955,246 | 9/1990 | Nakano | 74/200 |
| 5,820,512 | 10/1998 | Nakano | 476/10 |
| 5,971,886 | 10/1999 | Yamamoto | 476/10 |
| 6,030,309 | 2/2000 | Nakano | 476/10 |

FOREIGN PATENT DOCUMENTS

0 882 910  12/1998  European Pat. Off. .
1-295070  11/1989  Japan .

*Primary Examiner*—Allan D. Herrmann
*Attorney, Agent, or Firm*—Foley & Lardner

[57] ABSTRACT

A friction roller type continuously variable transmission comprises input and output discs arranged on a common axis; friction rollers each being operatively interposed between the input and output discs to transmit torque therebetween; supporting members each rotatably supporting the friction roller and having a shaft extending therefrom; servo-pistons each including a hollow boss portion which has the shaft of the corresponding supporting member slidably received therein, the hollow boss portion being capable of pushing the corresponding supporting member to pivot the corresponding friction roller to continuously change a speed ratio between the input and output discs; and links each connecting corresponding ends of the supporting members to suppress displacement of each friction roller which would occur when the friction roller is applied with a certain thrust from the input and output discs. Articulated structures are provided each being arranged between the hollow boss portion and the corresponding supporting member to permit a pivotal movement of the supporting member relative to the hollow boss portion. Positioning structures are further provided each effecting a relative rotational positioning between the supporting member and the corresponding hollow boss portion.

12 Claims, 9 Drawing Sheets

FRICTION ROLLER TYPE CONTINUOUSLY VARIABLE TRANSMISSION

BACKGROUND OF THE INVENTION

1. Field of the Invention

The present invention relates in general to continuously variable transmissions, and more particularly to the continually variable transmissions of a friction roller type.

2. Description of the Prior Art

In order to clarify the task of the present invention, a known friction roller type continuously variable transmission will be described with reference to FIGS. 9 and 10 of the accompanying drawings. Such transmission is shown in Japanese Patent First Provisional Publication 1-295070.

For ease of description, the friction roller type continuously variable transmission will be referred to as friction roller type-CVT hereinafter.

Figure 9:
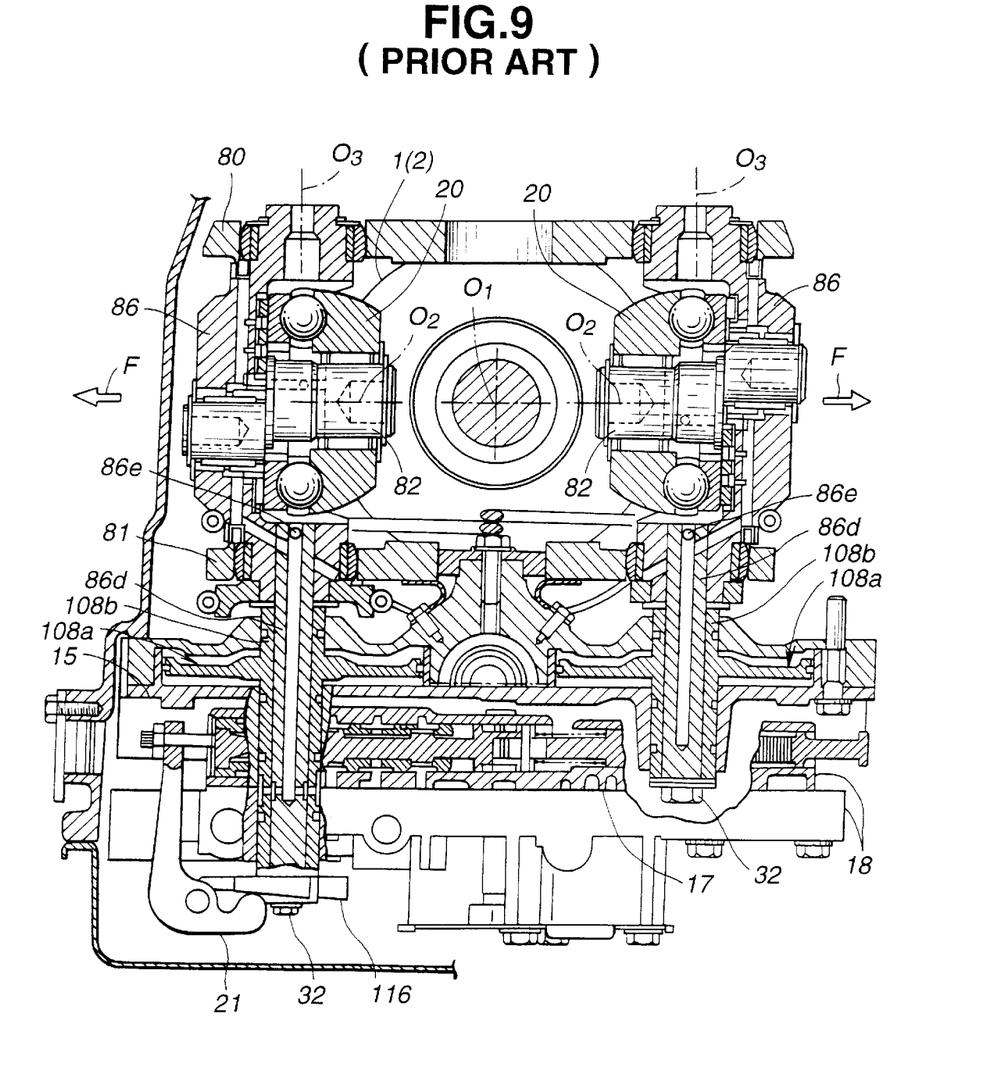
FIG. 9 is a sectional view of a conventional friction roller type-CVT.

FIG. 9 shows a part of the friction roller type-CVT of the Publication, which includes a servo-piston for carrying out the speed change control of the transmission.

In the drawing, denoted by numerals 1 and 2 are input and output cone discs which are arranged on a common rotation axis "O1", and denoted by numerals 20 and 20 are friction rollers (or power rollers) which are each operatively interposed between the input and output cone discs 1 and 2. The friction rollers 20 and 20 are arranged to face each other with the axis "O1" placed therebetween, as shown. That is, each friction roller 20 is put in a toroidal recess defined by both the input and output cone discs 1 and 2, while frictionally contacting with these discs 1 and 2. The friction rollers 20 and 20 are rotatably supported by respective trunnions 86 and 86 (or supporting members) through respective eccentric shafts 82 and 82. The input and output cone discs 1 and 2, the two friction rollers 20 and 20 and the trunnions 86 and 86 constitute a single toroidal power transmission unit.

In a double cavity toroidal type-CVT, two, that is, front and rear toroidal power transmission units are employed, which are coaxially arranged on the axis "O1" with their output cone discs 2 and 2 connected in a back-to-back connecting manner.

As is seen from FIG. 9, the trunnions 86 and 86 have respective upper ends connected through an upper link 80 and respective lower ends connected through a lower link 81. The connection of these parts is so made that each trunnion 86 can pivot between a neutral position as shown in FIG. 9 wherein a rotation axis "O2" of the friction roller 20 intersects the rotation axis "O1" of the input and output cone discs 1 and 2 and an offset position wherein the trunnion 86 is inclined toward a pivot axis "O3" of the friction roller 20 which intersects the rotation axis "O2" at right angles. The trunnion 86 pivots about the pivot axis "O3".

For carrying out the above-mentioned offset movement, each trunnion 86 has a shaft 86d connected to a lower end thereof through a pin 86e, the shaft 86d extending in the direction of the pivot axis "O3". Tightly disposed on the shaft 86d is a servo-piston 108a which is axially movably received in a cylinder body 15.

As is seen from the drawing, the shaft 86d of one (or the left one in the drawing) of the trunnions 86 and 86 has a lower end projected downward beyond a control valve body 18, to which a precess cam 116 is connected. The control valve body 18 has a control valve for generating a hydraulic pressure to operate the servo-piston 108a. A speed change link 21 is incorporated with the precess cam 116, through which an offset degree of the trunnion 86 in the direction of the pivot axis "O3" and a rotation degree of the trunnion 86 about the pivot axis "O3" are fed back to a speed control valve 17 in the control valve body 18.

As shown, the left shaft 86d having the precess cam 116 connected thereto and a hollow boss portion 108b of the servo-piston 108a for receiving the left shaft 86d pass through the cylinder body 15 and the control valve body 18. While, the right shaft 86d having no precess cam and a hollow boss portion 108b of the servo-piston 108a for receiving the right shaft 86d pass through only the cylinder body 15. Each shaft 86d has at a lower end a nut 32 secured thereto for achieving a united connection between the shaft 86d and the associated servo-piston 108a.

Upon receiving a speed change ratio command, the speed control valve 17 in the valve body 18 applies the servo-pistons 108a with a hydraulic pressure corresponding to the content of the command. With this, each servo-piston 108a forces through the corresponding shaft 86d the trunnion 86 to pivot between the above-mentioned neutral position of FIG. 9 and the above-mentioned offset position. Upon this, each friction roller 20 is pivoted about the pivot axis "O3" while bearing a component force applied thereto from the input and output cone discs 1 and 2, so that the rotation speed of the output cone disc 2 is continuously varied relative to that of the input cone disc 1. That is, due to continuously changing contact points of the friction rollers 20 and 20 to the input and output cone discs 1 and 2, the speed change ratio is continuously varied between the input and output cone discs 1 and 2. That is, a continuously variable speed change is carried out.

During the variable speed change, the above-mentioned feedback control is effected, so that with progression of the speed change, the trunnions 86 and 86 are forced to return toward their original positions, and when the existing speed change ratio becomes in agreement with a target value of the command, the trunnions 86 and 86 are returned to the original positions bringing the friction rollers 20 and 20 back to their neutral positions. With this, the speed change ratio can be kept at the target value.

However, due to its inherent construction, the above-mentioned conventional friction roller type-CVT tends to show the following phenomenon under operation thereof.

That is, under operation of the transmission, each friction roller 20 is hardly pressed by and between the input and output cone discs 1 and 2 with a force corresponding to a delivered torque therebetween because the torque delivery has to be made by shearing oil film placed between the friction roller 20 and each of the input and output cone discs 1 and 2. Accordingly, as is seen from FIG. 9, under operation of the transmission, each friction roller 20 is applied with a marked thrust "F" in a direction to be driven out from the input and output cone discs 1 and 2. For suppressing undesired displacement of the trunnions 86 and 86 even when such marked thrust "F" is applied thereto, the upper ends and lower ends of the paired trunnions 86 and 86 are connected through the respective upper and lower links 80 and 81, as is described hereinabove.

Figure 10:
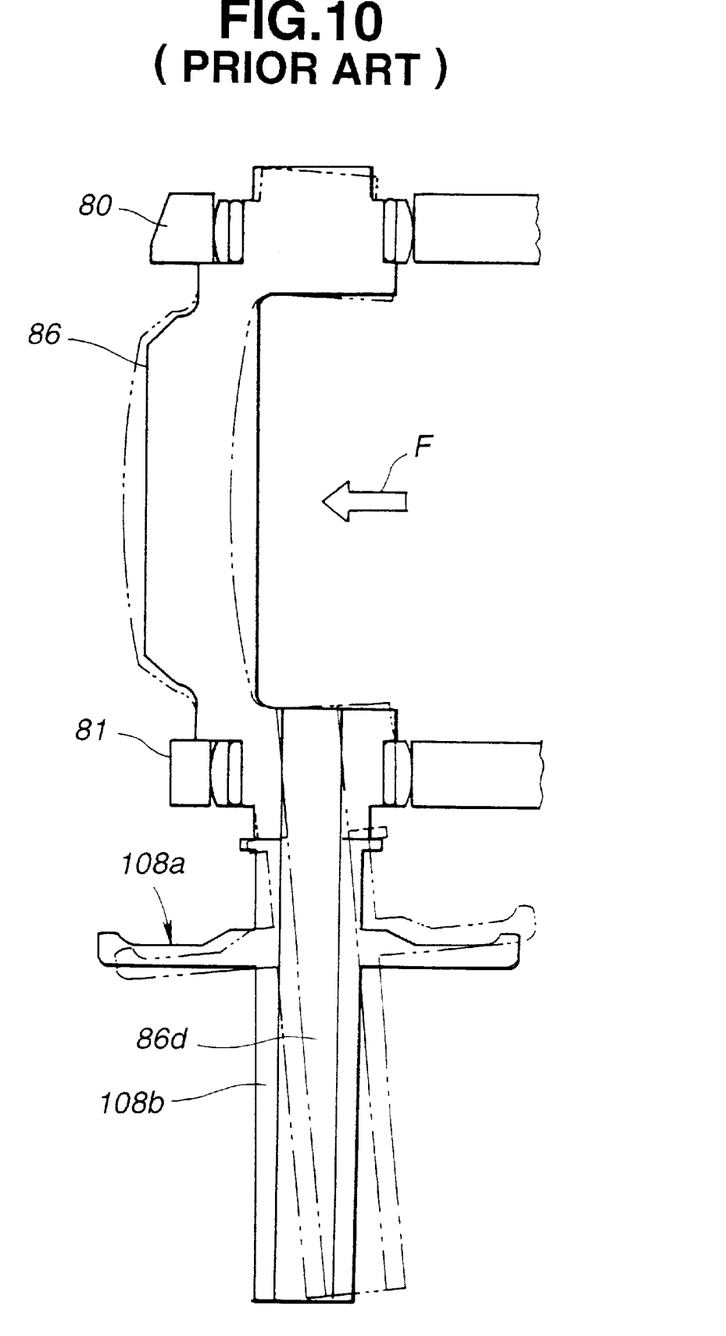
FIG. 10 is an illustration depicting an undesired phenomenon appearing in the conventional friction roller type-CVT.

However, as is understood from FIG. 10, even when the above-mentioned measure is employed to suppress the displacement of the trunnions 86 and 86, the following phenomenon tends to occur. That is, as is shown by phantom lines in the drawing, under operation of the transmission, the marked thrust "F" forces each trunnion 86 to be resiliently deformed slightly but by a certain degree using the upper and lower links 80 and 81 as fulcrums, so that the shaft 86d and the servo-piston 108a are forced to incline, as shown. This inclination tends to generate a marked friction force between the hollow boss portion 108b of the servo-piston 108a and a wall of a bore of the cylinder body 15 through which the boss portion 108b passes. It has been revealed that such friction becomes severer with increase of the length of the hollow boss portion 108b, like in the case of the longer hollow boss portion 108b to which the precess cam 116 is connected. Of course, in order to carry out smoothed and reliable operation of the friction roller-type CVT, elimination of such friction is needed. If the hollow boss portion 108b is of the longer type to which the precess cam 116 is connected, the feedback control effected by the precess cam 116 becomes poor.

SUMMARY OF THE INVENTION

Figure 11:
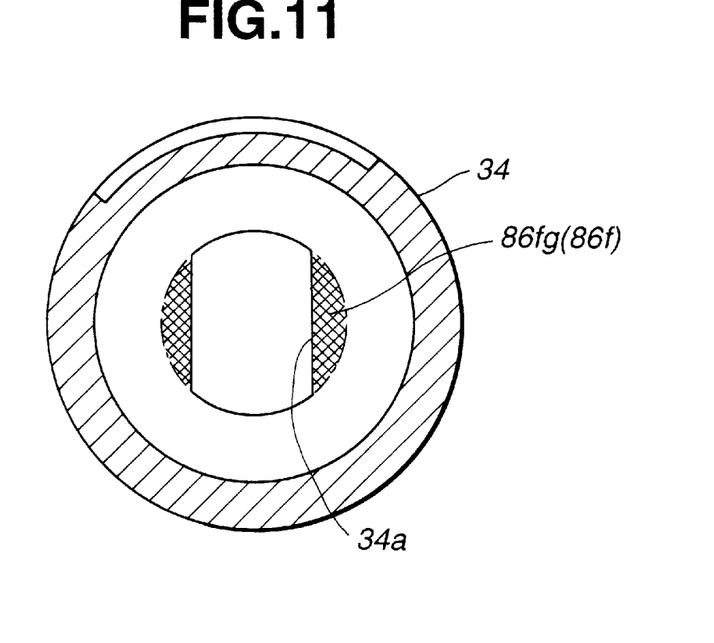
FIG. 11 is a sectional view of a wire pulley employed in the friction roller type-CVT described in U.S. patent application Ser. No. 09/090,183.
Figure 12:
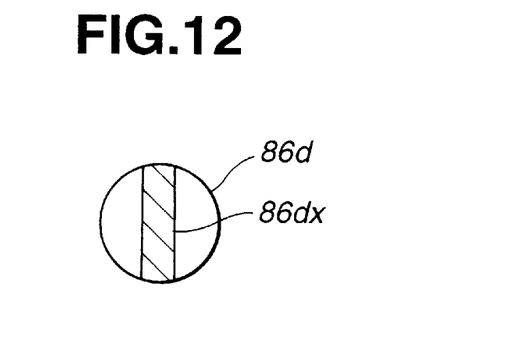
FIG. 12 is a sectional view of a trunnion shaft employed in the friction roller type-CVT of the U.S. patent application Ser. No. 09/090,183.
Figure 13:
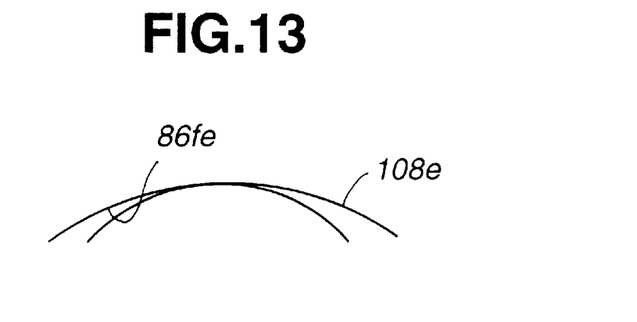
FIG. 13 is an illustration depicting mutually contacting rounded surfaces respectively possessed by a trunnion and a servo-piston which are employed in a modification of the friction roller type-CVT of the U.S. patent application Ser. No. 09/090,183 now U.S. Pat. No. 6,030,309.

In order to eliminate or at least minimize such friction, one of the inventors (viz., Masaki NAKANO) hitherto has proposed a unique measure which is described in Japanese Patent Application 9-147354 filed on Jun. 5, 1997. This unique measure is also described in U.S. patent application Ser. No. 09/090,183 filed on Jun. 4, 1998, now U.S. Pat. No. 6,030,309, based on the Japanese Patent Application. The friction roller type continuously variable transmission, that adopts the unique measure, comprises input and output discs arranged on a common axis; friction rollers each being operatively interposed between the input and output discs to transmit rotation therebetween; trunnions each rotatably supporting the friction roller and having a shaft extending therefrom; servo-pistons, each including a hollow boss portion in which the shaft of the corresponding trunnion is received, the hollow boss portion being capable of pushing the corresponding trunnion, so that when the servo-piston is axially moved, the corresponding friction roller pivots to continuously change a speed ratio between the input and output discs; links each connecting corresponding ends of the trunnions to suppress displacement of the friction roller which would occur when the friction roller is applied with a certain thrust from the input and output discs; and articulated structures associated with the trunnions respectively. Each of the articulated structures is arranged between the hollow boss portion and the corresponding trunnion to permit a pivotal movement of the trunnion relative to the corresponding hollow boss portion when the friction roller is applied with a certain thrust. The measure is depicted by FIGS. 11, 12, and 13 of the accompanying drawings, whose detailed explanation will be made hereinafter for ease of description.

In fact, with such measure, more specifically, with the articulated structures, the marked friction between the hollow boss portion 108b and the bore wall of the cylinder body 15 is eliminated or at least minimized. That is, with the articulated structure, the undesired resilient deformation of the trunnion 86 is hardly transmitted to the servo-piston 108a and the hollow boss portion 108b . However, in the friction roller type-CVT described in the above-mentioned U.S. patent application Ser. No. 09/090,183, reliable and easy positioning between parts in assembling process is given little thought.

It is therefore an object of the present invention to provide a friction roller type-CVT which is improved as compared with the transmission of the U.S. patent application Ser. No. 09/090,183. Due to the improvement, assembly of parts, such as a trunnion (viz., friction roller supporting member), a corresponding servo-piston and associated parts, is easily carried out assuring a precise positioning therebetween. Of course, the inevitably occurring resilient deformation of the trunnion caused by the above-mentioned thrust "F" is absorbed by an articulated structure arranged between the trunnion and the servo-piston, so that the deformation has substantially no effect on the servo-piston.

It is another object of the present invention to provide a friction roller type-CVT in which an articulated structure is so constructed and arranged as to provide a precise positioning between a trunnion (viz., friction roller supporting member), a servo-piston and a precess cam in an assembling precess.

According to the present invention, there is provided a friction roller type continuously variable transmission which comprises input and output discs arranged on a common axis; friction rollers each being operatively interposed between the input and output discs to transmit torque therebetween; supporting members each rotatably supporting the friction roller and having a shaft extending therefrom; servo-pistons each including a hollow boss portion which has the shaft of the corresponding supporting member slidably received therein, the hollow boss portion being capable of pushing the corresponding supporting member to pivot the corresponding friction roller to continuously change a speed ratio between the input and output discs; links each connecting corresponding ends of the supporting members to suppress displacement of each friction roller which would occur when the friction roller is applied with a certain thrust from the input and output discs; articulated structures each being arranged between the hollow boss portion and the corresponding supporting member to permit a pivotal movement of the supporting member relative to the hollow boss portion; and positioning structures each effecting a relative rotational positioning between the supporting member and the corresponding hollow boss portion.

DETAILED DESCRIPTION OF THE EMBODIMENTS

In the following, embodiments of the present invention will be described in detail with reference to the accompanying drawings. In the following description, the terms such as upper, lower, right, left, upward, downward, rightward, leftward and the like are to be understood with respect to the drawing or drawings in which the objective member or construction is illustrated.

Figure 1:
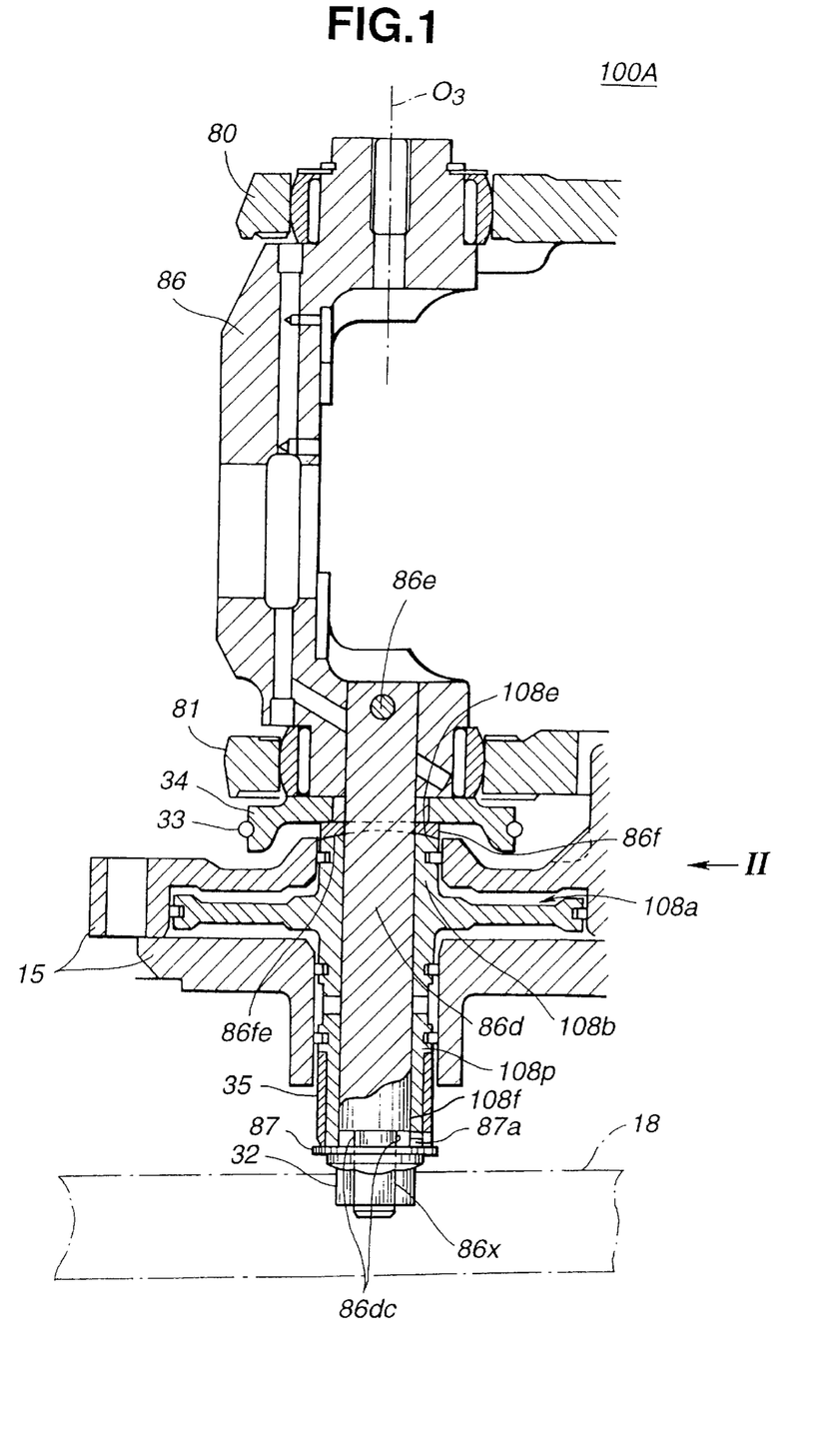
FIG. 1 is a sectional view of a part of a friction roller type-CVT of a first embodiment of the present invention, where a trunnion and a servo-piston are arranged.

Referring to FIG. 1, there is shown a part of a friction roller type-CVT 100A of a first embodiment of the present invention, where a trunnion and a servo-piston are arranged. The base construction of the CVT 100A is substantially the same as that of the above-mentioned known CVT of FIG. 9.

That is, like the known CVT of FIG. 9, in the friction roller type-CVT 100A of the first embodiment, through a plurality of friction rollers, a power transmission is carried out between input and output cone discs, and each friction roller is rotatably supported by a trunnion. As is seen from FIG. 9, also in the first embodiment 100A, each trunnion (86) can pivot between a neutral position wherein as is shown in this drawing a rotation axis "O2" of the friction roller (20) intersects a rotation axis "O1" of the input and output cone discs (1) and (2) and an offset position wherein the trunnion (86) is inclined toward a pivot axis "O3" of the friction roller (20) which intersects the rotation axis "O2" at right angles. Due to continuous pivoting of the trunnion (86) about the pivot axis "O3", the transmission of power from the input cone disc 1 to the output cone disc 2 is carried out while continuously varying the speed ratio therebetween. More specifically, the two friction rollers (20) and (20) are each operatively interposed between the input and output cone discs (1) and (2). That is, each friction roller (20) is put in a toroidal recess defined by both the input and output cone discs (1) and (2), while frictionally contacting with these discs (1) and (2). The friction rollers (20) and (20) are rotatably supported by respective trunnions (86) and (86) through respective eccentric shafts (82) and (82). Each trunnion (86) is has a servo-piston (108a) incorporated therewith in the above-mentioned manner. The input and output cone discs (1) and (2) and the two friction rollers (20) and (20) constitute one toroidal power transmission unit.

It is to be noted that a trunnion 86 shown in FIG. 1 is of a type having no precess cam connected thereto. In a double cavity toroidal type-CVT wherein front and rear toroidal power transmission units are employed and thus four trunnions are employed, three of the four trunnions have the same construction as that of the trunnion 86 of FIG. 1.

As is seen from FIG. 1, the trunnion 86 has a lower end from which a shaft 86d extends downward. The shaft 86d has an upper end connected through a connecting pin 86e to the lower end of the trunnion 86. The shaft 86d passes through a washer 86f, a hollow boss portion 108b of a servo-piston 108a and a pawl washer 87. A threaded lower end (which is shaped into a rectangular parallelepiped as will become apparent hereinafter) of the shaft 86d has a nut 32 engaged thereto for tightly holding the parts 34, 108a and 87. Due to a certain thrust produced by the nut 32, an upper surface of the washer 86f is tightly pressed against the lower end surface of the trunnion 86.

The lower end of the trunnion 86 has a wire pulley 34 immovably connected thereto. The wire pulley 34 puts thereon a looped wire 33 which extends to another wire pulley (34) incorporated with a trunnion (not shown) employed in another toroidal power transmission unit. That is, due to usage of this looped wire 33, synchronous operation is achieved between the friction rollers in the front transmission unit and those in the rear transmission unit.

As is seen from FIG. 11, the wire pulley 34 has a non-circular center opening 34a with which a rectangular parallelepiped lower end of the trunnion 86 is snugly engaged, so that the wire pulley 34 is suppressed from rotation relative to the trunnion 86. Due to usage of the washer 86f, the wire pulley 34 is held in position. As understood from the drawing, an upper face 86fq of the washer 86f, which is indicated by a grilled area, has a larger area for evenly contacting with the wire pulley 34.

As shown in FIG. 12, the shaft 86d may have a thinner middle portion 86dx which is placed in the hollow boss portion 108b of the piston 108.

Like in the conventional CVT of FIG. 9, upper and lower links (80) and (81) are employed for suppressing undesired displacement of the friction rollers (20) and (20) which would be caused by the thrust applied thereto from the input and output cone discs (1) and (2).

As is seen from FIG. 1, a lower surface 86fe of the washer 86f is shaped concave and an upper end 108e of the hollow boss portion 108b of the piston 108a, which contacts the concave lower surface 86fe of the washer 86f, is shaped convex. More specifically, the concave lower surface 86fe of the washer 86f and the convex surface of the upper end 108e of the hollow boss portion 108b are each shaped to constitute part of an imaginary cylindrical wall whose center axis (not shown) extends in parallel with an axis of the connecting pin 86e, that is, in a direction perpendicular to the surface of FIG. 1. That is, the concave lower surface 86fe and the convex upper end 108e, which mutually contact to each other, thus constitute a so-called "articulated structure" which can appropriately absorb undesired resilient deformation of the trunnion 86 which would occur when the friction roller (20) is applied with a marked outward thrust from the associated input and output cone discs (1) and (2).

As is seen from FIG. 13, if desired, a radius of curvature of the convex upper end 108e of the hollow boss portion 108b of the piston 108a may be smaller than that of the concave lower surface 86fe of the washer 86f.

Figure 2:
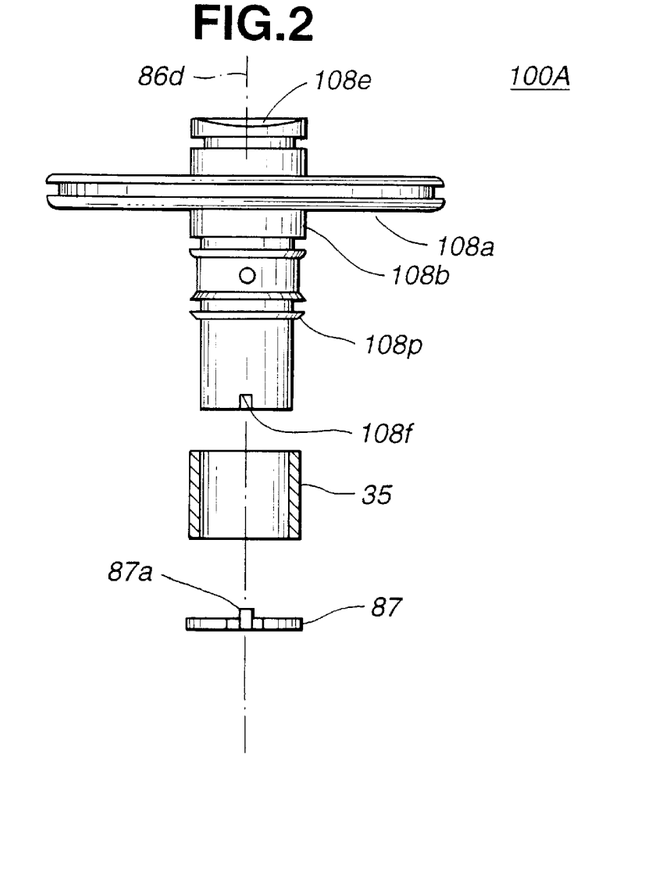
FIG. 2 is a partially sectioned side view of a servo-piston which is used in the first embodiment.

Referring to FIG. 2, there is shown a partially sectioned side view of the servo-piston 108a, which is taken from the direction of an arrow "II" of FIG. 1. The upper end 108e of the hollow boss portion 108b of the piston 108a is shaped convex. If desired, as shown in FIG. 2, the upper end 108e of piston 108a and the lower surface 86fe of the washer 86f may be shaped concave and convex respectively, in contrast with the above-mentioned arrangement.

As is mentioned hereinabove, the concave lower surface 86fe of the washer 86f and the convex surface of the upper end 108e of the piston 108a are each shaped to constitute an imaginary cylindrical wall whose center axis (not shown) extends in parallel with an axis of the connecting pin 86e, that is, in a direction perpendicular to the surface of FIG. 1, that is, in lateral direction in FIG. 2. With this, a so-called "articulated structure" is constituted between the washer 86f and the upper end 108e of the piston 108a, by which undesired resilient deformation of the trunnion 86, which would occur when the friction roller (20) is applied with a marked outward thrust from the input and output cone discs (1) and (2), is appropriately absorbed. That is, due to the articulated structure, the trunnion 86 is permitted to pivot toward the direction in which the thrust is applied.

If desired, the above-mentioned articulated structure may be constituted without using the washer 86*f*. That is, the articulated structure may be constituted by the lower end of the trunnion 86 and the upper end 108*e* of the piston 108*a*, which directly and slidably contact. That is, in this case, the lower end of the trunnion 86 is shaped concave or convex and the upper end 108*e* of the piston 108*a* is shaped convex or concave.

In addition to the above-mentioned articulated structure, the following measure is further employed in the friction roller type-CVT 100A of the first embodiment of the invention.

That is, as is seen from FIG. 1, an aluminum collar 35 is disposed about a lower part of the hollow boss portion 108*b* of the servo-piston 108*a* having its lower end held by the pawl washer 87. As shown, the lower portion of the hollow boss portion 108*b* is somewhat projected downward from a flanged cylindrical bore formed in a cylinder body 15. An outer diameter of the collar 35 is slightly smaller than an inner diameter of the flanged cylindrical bore. With this, the hollow boss portion 108*b* of the piston 108*a* which is usually constructed of iron is suppressed from making a direct engagement with the inner wall of the flanged bore of the cylinder body 15 which is usually constructed of aluminum. For suppressing excessive upper movement of the collar 35, the hollow boss portion 108*b* is formed with an annular ridge 108*p* against which an upper end of the collar 35 abuts. In the illustrated embodiment, the annular ridge 108*b* is a lower one of paired ridges between which a seal ring (no numeral) is disposed.

As is seen from FIG. 1, in order to achieve a precise positioning between the trunnion 86 and the servo-piston 108*a*, the hollow boss portion 108*b* of the piston 108 is formed at its lower end with a small cut 108*f*. That is, the small cut 108*f* is so provided as to facilitate positioning of the convex upper end 108*e* of the hollow boss portion 108*b* relative to the concave lower surface 86*fe* of the washer 86*f*. In the assembled condition as shown in FIG. 1, the small cut 108*f* is located at a right end of the lower end of the hollow boss portion 108*b*.

As is seen from FIG. 1, the lower end of the shaft 86*d* is formed with a reduced extension 86*x* which has a rectangular cross section. Parallel opposed surfaces of the reduced extension 86*x* are denoted by numerals 86*dc* and 86*dc*. In the assembled condition as shown in FIG. 1, the parallel opposed surfaces 86*dc* and 86*dc* extend perpendicular to the face of the illustration of FIG. 1.

Figure 3A:
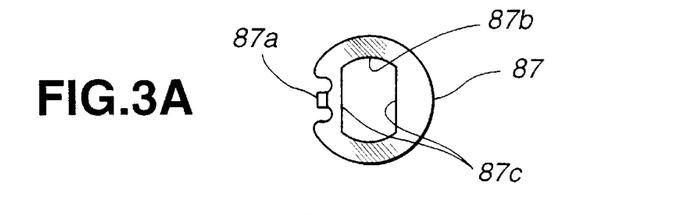
FIGS. 3A and 3B are plan and sectional views of a pawl washer used in the first embodiment.
Figure 3B:
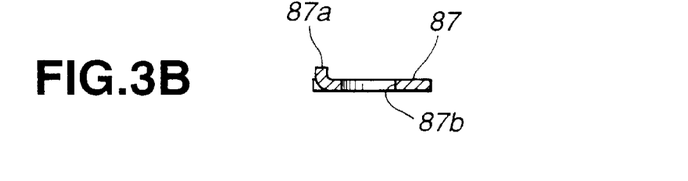

As is seen from FIG. 3A, the pawl washer 87 has a generally rectangular opening 87*b* with parallel opposed side edges 87*c* and 87*c*. That is, the pawl washer 87 is disposed on the lower extension 86*x* of the shaft 86*d* having the opposed side edges 87*c* and 87*c* mated with the opposed surfaces 86*dc* and 86*dc* of the lower extension 86*x*. As is seen from FIGS. 3A and 3B, the pawl washer 87 is formed with a pawl 87*a* which is raised. Upon the pawl washer 87 being disposed on the lower extension 86*x* of the shaft 86*d*, the raised pawl 87*a* is put into the small cut 108*f* of the hollow boss portion 108*b* of the servo-piston 108. That is, upon assembly with the pawl 87*a* put into the small cut 108*f*, the convex upper surface 108*e* of the hollow boss portion 108*b* of the piston 108*a* becomes mated with the concave lower surface 86*fe* of the washer 86*f*. It is to noted that when, with the pawl 87*a* kept engaged with the small cut 108*f*, the nut 32 is turned in a fastening direction, the contact pressure between the concave lower surface 86*fe* of the washer 86*f* and the convex upper end 108*e* of the hollow boss portion 108*b* of the piston 108*a* increases.

As is understood from the above, the mated engagement between the rectangular opening 87*b* of the pawl washer 87 and the rectangular parallelepiped lower extension 86*x* of the shaft 86*d* and the engagement between the pawl 87*a* of the washer 87 and the small cut 108*f* of the hollow boss portion 108*b* of the servo-piston 108*a* bring about easy and precise assembling of those parts, that is, easy and precise positioning of the servo-piston 108*a* relative to the washer 86*f*. That is, the articulated structure between the trunnion 86 and the servo-piston 108*a*, which comprises the concave lower surface 86*fe* of the washer 86*f* and the convex upper end 108*e* of the servo-piston 108*a*, can be assuredly and precisely set.

A control valve structure employed in this first embodiment 100A is substantially the same as that of the above-mentioned conventional CVT of FIG. 9. That is, a control valve body 18 contains a speed control valve (17, see FIG. 9) which feeds each servo-piston 108*a* with a hydraulic pressure in accordance with a speed change ratio command. With this, as has been mentioned hereinabove, each piston 108*a* is axially moved in a certain direction causing, through the shaft 86*d*, the corresponding trunnion 86 to pivot from the neutral position wherein as is understood form FIG. 9 a rotation axis "O2" of the friction roller (20) intersects a rotation axis "O1" of the input and output cone discs (1) and (2) toward the offset position wherein the trunnion 86 is inclined toward a pivot axis "O3" of the friction roller (20) which intersects the rotation axis "O2" at right angles.

During this, each friction roller (20) is gradually inclined in a certain direction about the pivot axis "O3" against a partial force applied thereto from the input and output cone discs (1) and (2) thereby to carry out the stepless speed change of the output cone disc (2) relative to the input cone disc (1).

During this stepless speed change, the movement of the piston 108*a* and the winding of the friction roller (2) are fed back, through a precess cam 116 (see FIG. 4) secured to the corresponding shaft 86*d*, to the speed control valve (17). Due to this feedback operation, with progression of the speed change, the trunnions 86 and 86 are forced to return toward their original positions, and when the existing speed change ratio becomes in agreement with a target value of the command, the trunnions 86 and 86 are returned to the original positions bringing the friction rollers (20) and (20) back to their neutral positions. With this, the speed change ratio can be kept at the target value.

As is described hereinabove, in the friction roller-type CVT 100A of the first embodiment, an articulated structure is provided between each trunnion 86 and the corresponding servo-piston 108*a*, which comprises the concave lower surface 86*fe* of the washer 86*f* and the convex upper end 108*e* of the piston 108*a*. Thus, like the friction roller type-CVT described in the above-mentioned U.S. patent application Ser. No. 09/090,183, now U.S. Pat. No. 6,030,309, in the CVT 100A of the first embodiment, each trunnion 86 is permitted to make a suitable pivoting relative to the corresponding servo-piston 108*a* when applied with a certain thrust from the corresponding friction roller (20).

In addition to the above, in the first embodiment 100A, due to the above-mentioned unique arrangement between the pawl washer 87 and the small cut 108*f* of the piston 108*a* and the mated engagement between the rectangular opening 87*b* of the pawl washer 87 and the rectangular parallelepiped lower extension 86*x* of the shaft 86*d*, assembly of these parts and thus that of the CVT are easily and precisely carried out assuring a precise positioning of the articulated structure relative to the surrounding parts.

Figure 4:
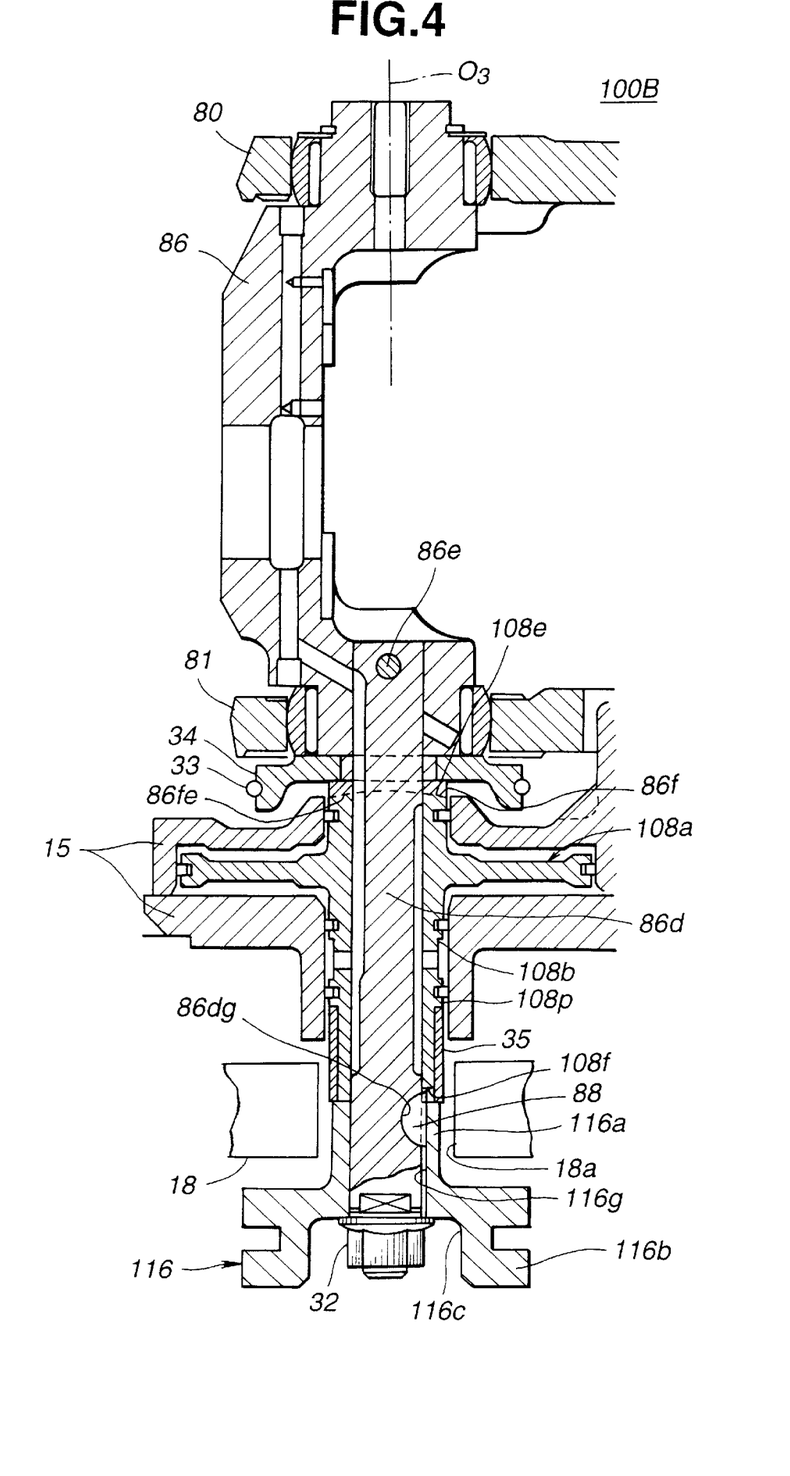
FIG. 4 is a view similar to FIG. 1, but showing a second embodiment of the present invention wherein the invention is practically applied to a trunnion of a type with which a precess cam is incorporated.

Referring to FIG. 4, there is shown a second embodiment 100B of the present invention wherein the invention is applied to a trunnion 86 of a type with which a precess cam 116 is incorporated. Since the construction of this second embodiment is similar to that of the first embodiment 100A of FIG. 1, only parts and portions which are different from those of the first embodiment will be described in the following. Substantially same parts and portions as those of the first embodiment are denoted by the same numerals.

As will be seen when comparing FIGS. 4 and 1, the shaft 86*d* to which the precess cam 116 is connected is longer than the shaft 86*d* of FIG. 1. That is, the shaft 86*d* shown in FIG. 4 has such a sufficient length as to project beyond the control valve body 18. Thus, the shaft 86*d* has a lower portion sufficiently projected beyond the lower end of the hollow boss portion 108*b* of the piston 108*a*, as shown. An aluminum collar 35 is disposed on the lower part of the hollow boss portion 108*b* of the servo-piston 108*a*, like in the above-mentioned construction of FIG. 1.

The precess cam 116 is secured through the nut 32 to the projected lower end of the shaft 86*d*. That is, the projected lower end of the shaft 86*d* is threaded to which the nut 32 is engaged. As shown, the precess cam 116 comprises a hollow portion 116*a* which is disposed on the lower portion of the shaft 86*d* and a cam portion 116*b* which has a circular recess 116*c* formed therein. As shown, upon assembly, the nut 32 is engaged with the threaded lower end of the shaft 86*d* while being pressed against the bottom of the circular recess 116*c* of the cam portion 116*b*. With this, an upper end of the hollow portion 116*a* of the precess cam 116 tightly abuts against the lower end of the hollow boss portion 108*b* of the piston 108*a*.

For achieving precise positioning between the trunnion 86, the servo-piston 108*a* and the precess cam 116 upon assembly, the following measure is employed.

That is, the lower end of the hollow boss portion 108*b* of the piston 108*a* is formed with a small cut 108*f*. The shaft 86*d* is formed at a cylindrical wall thereof with an axially extending semicircular key recess 86*dg*, and the hollow portion 116*a* of the precess cam 116 is formed at an inner cylindrical wall thereof with an axially extending key groove 116*g*. The key recess 86*dg* and the key groove 116*g* extend in a direction parallel with an axis of the shaft 86*d*. As will become apparent hereinafter, upon assembly, the small cut 108*f*, the semicircular key recess 86*dg* and the key groove 116*g* are aligned and positioned by a sunk key 88 engaged therewith. The key 88 is semicircular in shape.

Figures 5A, 5B:
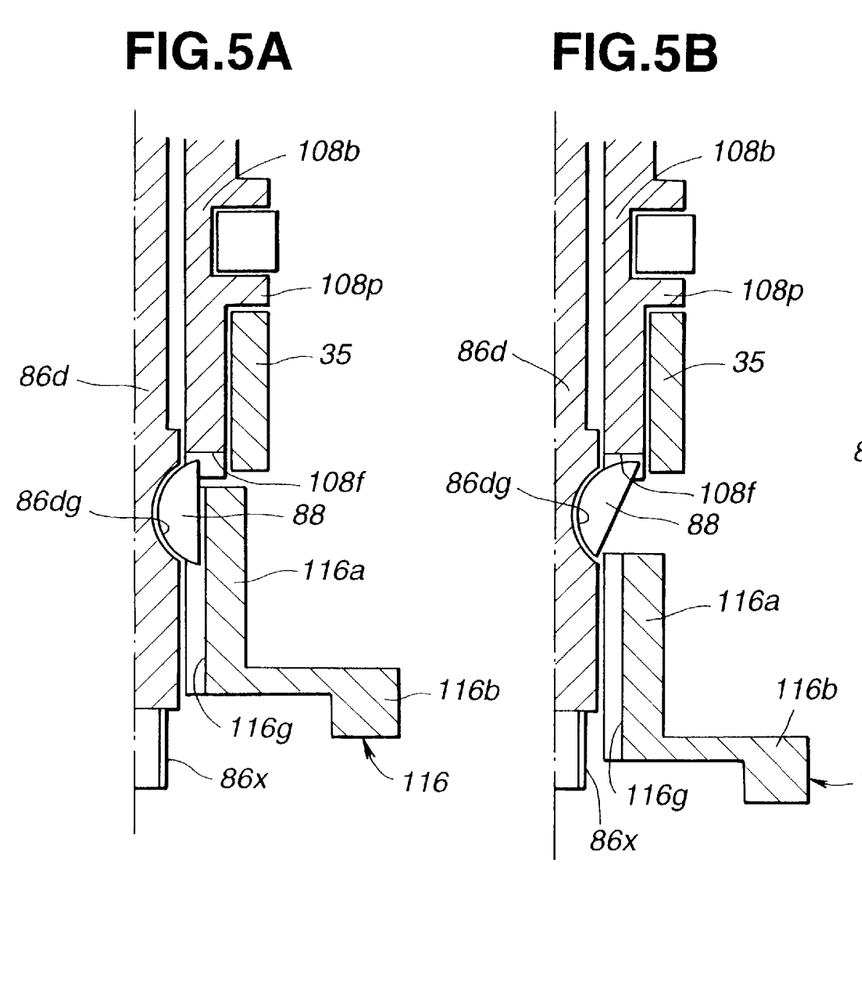
FIGS. 5A, 5B and 5C are sectional views showing proper (FIG. 5A) and improper (FIGS. 5B and 5C) conditions which may be taken when assembling a trunnion shaft, a servo-piston and a precess cam in the second embodiment.

In assembly, as is seen from FIG. 5A, the shaft 86*d* and the hollow boss portion 108*b* of the piston 108*a* are so positioned that the semicircular key recess 86*dg* and the small cut 108*f* are aligned and mated. Then, the sunk key 88 is sled into the key recess 86*dg* and the small cut 108*f*, and then the collar 35 is disposed onto the hollow boss portion 108*b*. Then, as is seen from FIG. 4, the control valve body 18 is mounted to a given position having the lower portion of the shaft 86*d* projected downward through an opening 18*a* formed in the body 18. Then, as is seen from FIG. 5A, the hollow portion 116*a* of the precess cam 116 is disposed on the projected lower portion of the shaft 86*d* having the key groove 116*g* engaged with the key 88. Finally, as is seen from FIG. 4, the nut 32 is engaged with the threaded lower end of the shaft 86*d* pressing the precess cam 116 against the lower end of the hollow boss portion 108*b* of the piston 108*a*.

Thus, positioning of the servo-piston 108*a* and the precess cam 116 relative to the shaft 86*d* of the trunnion 86 is easily and precisely achieved by the key 88, which promotes the precise positioning between the concave lower surface 86*fe* of the washer 86*f* and the convex upper end 108*e* of the hollow boss portion 108*b* of the piston 108*a*.

Figure 5C:
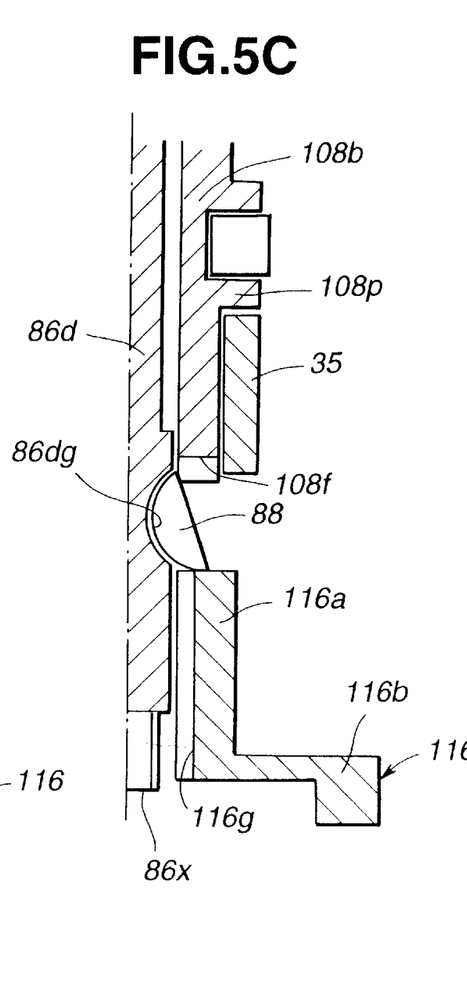

FIGS. 5B and 5C show cases wherein the sunk key 88 is improperly held in the semicircular key recess 86*dg* during assembling step. In these cases, setting of the precess cam 116 to a proper position is not achieved, as is easily understood from these drawings.

Figure 6:
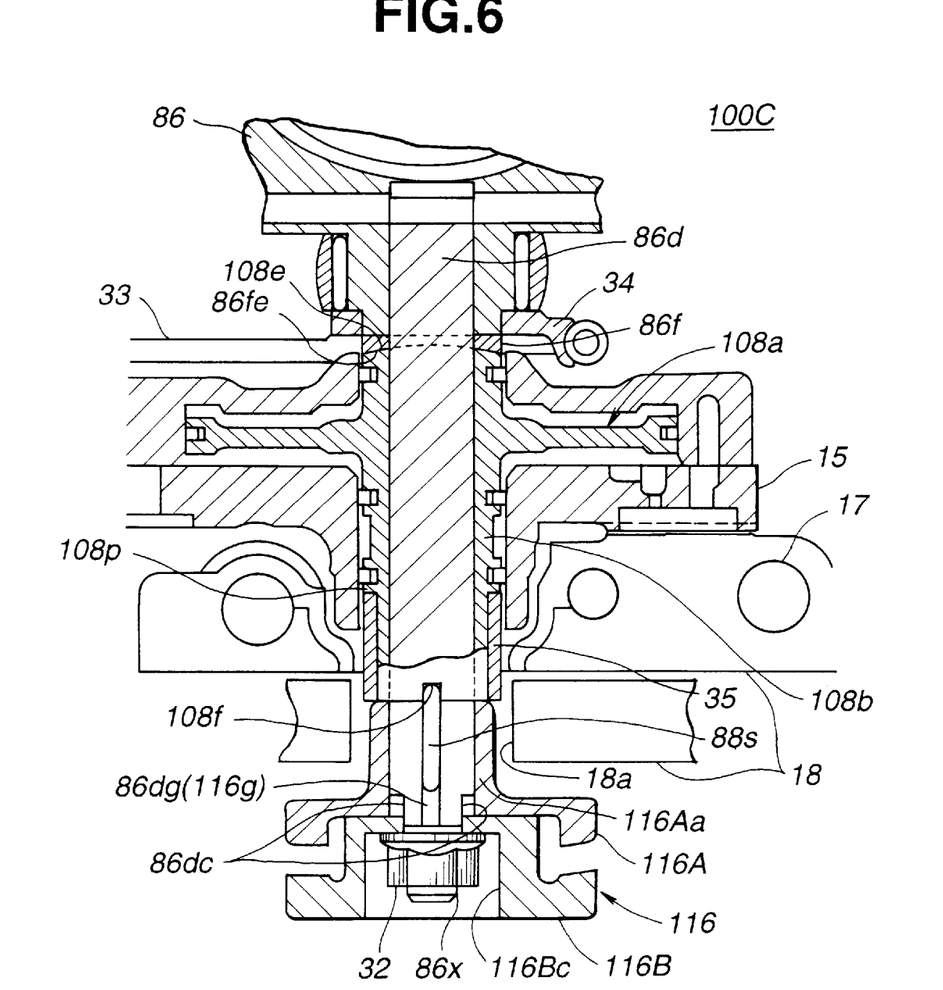
FIG. 6 is a view similar to FIG. 4, but showing a third embodiment of the present invention wherein the invention is practically applied to a trunnion of a type with which a precess cam is incorporated.
Figure 7:
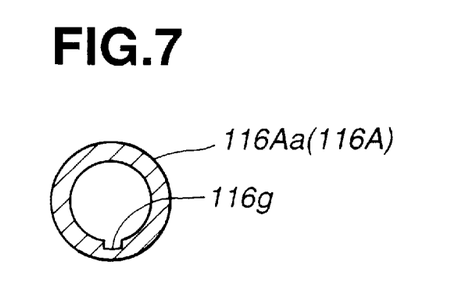
FIG. 7 is a sectional view of an essential portion of the precess cam used in the third embodiment.

Referring to FIGS. 6 and 7, particularly FIG. 6, there is shown a third embodiment 100C of the present invention wherein the invention is applied to a trunnion 86 of a type with which a precess cam 116 is incorporated. Since the construction of this third embodiment is similar to that of the above-mentioned second embodiment 100B of FIG. 4, only parts and portions which are different from those of the second embodiment will be described in the following. Substantially same parts and portions as those of the second embodiment are denoted by the same numerals.

As is seen from FIG. 6, in the third embodiment 100C, the articulated structure is somewhat different from that of the above-mentioned first and second embodiments 100A and 100B.

That is, in the third embodiment 100C, the washer 86*f* is directly disposed between a lower flat end of the trunnion 86 and the convex upper end 108*e* of the hollow boss portion 108*b* of the piston 108*a*. Furthermore, in the third embodiment 100C, the precess cam 116 is of a split type including an upper part 116A and a lower part 116B which are coupled when being connected to the shaft 86*d* through the nut 32. The upper part 116A has a hollow portion 116A*a* disposed on the lower portion of the shaft 86*d*, and the lower part 116B has a circular recess 116B*c* formed therein. As shown, upon assembly, the nut 32 is engaged with the threaded lower end of the shaft 86*d* while being pressed against the bottom of the circular recess 116B*c* of the lower part 116B. With this, an upper end of the hollow portion 116A*a* of the precess cam 116 tightly abuts against the lower end of the lower boss portion 108*b* of the servo-piston 108*a*. The lower part 116B of the precess cam 116 is formed with a non-circular opening (no numeral) through which a reduced extension 86*x* of the shaft 86*d* passes in such a manner as not to permit a rotational displacement of the lower part 116B relative to the reduced extension 86*x*.

Besides, the hollow boss portion 108*b* of the servo-piston 108*a* is formed at its lower end with a small cut 108*f*. The shaft 86*d* of the trunnion 86 is formed at its lower cylindrical outer wall with an axially extending key groove 86*dg*, and the hollow portion 116A*a* of the upper part 116A of the precess cam 116 is formed at an inner cylindrical wall thereof with an axially extending key groove 116*g*. The key groove 116*g* of the hollow portion 116A*a* is clearly shown in FIG. 7.

In assembly, as is seen from FIG. 6, the hollow boss portion 108*b*, the shaft 86*d* and the hollow portion 116A*a* are so arranged that the small cut 108*f*, the key groove 86*dg* and the key groove 116*g* are aligned and mated. A sliding key 88*s* is sled into these aligned and mated grooves 108*f*, 86*dg* and 116*g*. Finally, the nut 32 is engaged with the threaded lower end of the shaft 86*d* to press the precess cam 116 against the lower end of the hollow boss portion 108*b* of the piston 108*a*.

Thus, like in the second embodiment 100B, positioning between the servo-piston 108*a*, the shaft 86*d* of the trunnion 86 and the precess cam 116 is easily and precisely achieved by the sliding key 88*s*, which promotes precise positioning between the concave lower surface 86*fe* of the washer 86*f* and the convex upper end 108*e* of the hollow boss portion 108*b* of the piston 108*a*.

Figure 8:
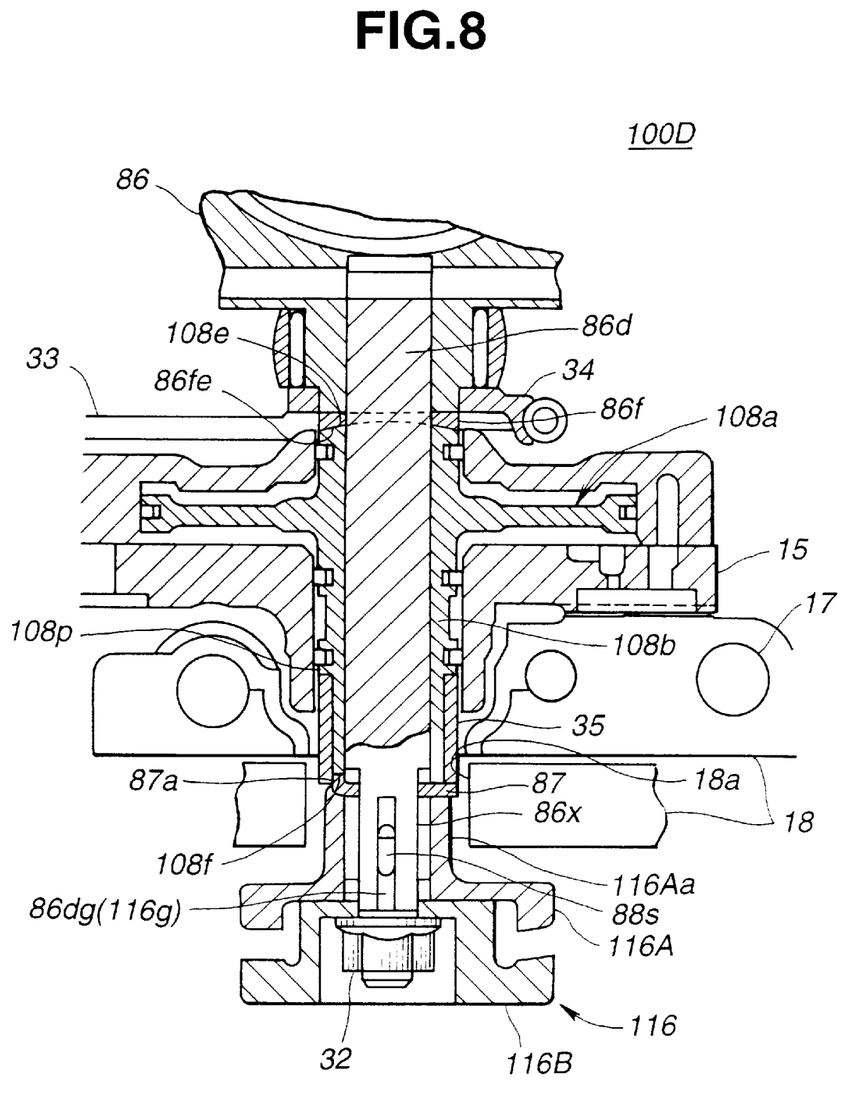
FIG. 8 is a view similar to FIG. 6, but showing a fourth embodiment of the present invention wherein the invention is practically applied to a trunnion of a type with which a precess cam is incorporated.

Referring to FIG. 8, there is shown a fourth embodiment 100D of the present invention wherein the invention is applied to a trunnion 86 of a type with which a precess cam 116 is incorporated. Since the construction of this fourth embodiment 100D is similar to that of the above-mentioned third embodiment 100C of FIG. 6, only parts and portions which are different from those of the third embodiment 100C will be described in detail in the following. Substantially same parts and portions as those of the third embodiment 100C are denoted by the same numerals.

As shown, in the fourth embodiment 100D, the articulated structure is the same as that employed in the third embodiment 100C and the precess cam 116 is of the split type including an upper part 116A and a lower part 116B.

In the fourth embodiment 100D, a pawl washer 87 (see FIGS. 3A and 3B) is employed for achieving positioning between the precess cam 116 and the piston 108*a*, and a sliding key 88*s* is employed for achieving positioning between the shaft 86*d* of the trunnion 86 and the precess cam 116.

That is, the hollow boss portion 108*b* of the piston 108*a* is formed at its lower end with a small cut 108*f* with which a raised pawl 87*a* of the pawl washer 87 is engaged. The pawl washer 87 is disposed on a rectangular parallelepiped lower extension 86*x* of the shaft 86*d*. The shaft 86*d* of the trunnion 86 is formed at its lower cylindrical outer wall with an axially extending key groove 86*dg*. The hollow portion 116A*a* of the upper part 116A of the precess cam 116 is formed at an inner cylindrical wall thereof with an axially extending key groove 116*g*. The lower part 116B of the precess cam 116 is formed with a non-circular opening (no numeral) through which the rectangular parallelepiped lower extension 86*x* passes in a manner as not to permit rotational displacement of the lower part 116B relative to the lower extension 86*x*.

In assembly of this fourth embodiment 100D, the following steps are carried out.

First, the shaft 86*d* and the servo-piston 108*a* are coupled, and the collar 35 is disposed on the lower part of the hollow boss portion 108*b* of the piston 108*a*. Then, the pawl washer 87 is disposed onto the rectangular parallelepiped lower extension 86*x* of the shaft 86*d* bringing the pawl 87*a* into engagement with the small cut 108*f* of the hollow boss portion 108*b*. With this, positioning between the shaft 86*d* (viz., trunnion 86) and the hollow boss portion 108*b* (viz., piston 108*a*) is achieved. Then, the control valve body 18 is mounted to a given position having the lower portion of the shaft 86*d* projected downward through the opening 18*a* of the body 18. Then, the upper part 116A of the precess cam 116 is disposed on the projected lower portion of the shaft 86*d*. Then, the sliding key 88*s* is sled into the grooves 86*dg* and 116*g* which are mated. With this, positioning between the shaft 86*d* (viz., trunnion 86) and the upper part 116A (viz., precess cam 116) is achieved. Then, the lower part 116B of the precess cam 116 is put onto the lower extension 86*x* and coupled to the upper part 116A by engaging the nut 32 with the threaded lower end of the shaft 86*d*.

Accordingly, like in the third embodiment 100C, positioning between the servo-piston 108*a*, the shaft 86*d* of the trunnion 86 and the precess cam 116 is easily and precisely achieved by the pawl washer 87 and the sliding key 88*s*, which promotes precise positioning between the concave lower surface 86*fe* of the washer 86*f* and the convex upper end 108*e* of the hollow boss portion 108*b* of the piston 108*a*.

What is claimed is:

1. A friction roller type continuously variable transmission comprising:

input and output discs arranged on a common axis;

friction rollers each being operatively interposed between said input and output discs to transmit torque therebetween;

supporting members each rotatably supporting the friction roller and having a shaft extending therefrom;

servo-pistons each including a hollow boss portion which has the shaft of a corresponding supporting member slidably received therein, said hollow boss portion being capable of pushing the corresponding supporting member to pivot the corresponding friction roller to continuously change a speed ratio between said input and output discs;

links each connecting corresponding ends of said supporting members to suppress displacement of each friction roller which would occur when said input and output disk apply a thrust to the friction roller;

articulated structures each being arranged between said hollow boss portion and the corresponding supporting member to permit a pivotal movement of the supporting member relative to said hollow boss portion only in a direction of the thrust; and positioning structures each preventing a relative rotational movement between the supporting member and the corresponding hollow boss portion.

2. A friction roller type continuously variable transmission comprising:

input and output discs arranged on a common axis;

friction rollers each being operatively interposed between said input and output discs to transmit torque therebetween;

supporting members each rotatably supporting the friction roller and having a shaft extending therefrom;

servo-pistons each including a hollow boss portion which has the shaft of a corresponding supporting member slidably received therein, said hollow boss portion being capable of pushing the corresponding supporting member to pivot the corresponding friction roller to continuously change a speed ratio between said input and output discs;

links each connecting corresponding ends of said supporting members to suppress displacement of each friction roller which would occur when the friction roller is applied with a thrust from said input and output discs;

articulated structures each being arranged between said hollow boss portion and the corresponding support member to permit a pivotal movement of the supporting member relative to said hollow boss portion; and positioning structures each affecting a relative rotational positioning between the supporting member and the corresponding hollow boss portion wherein each of said positioning structures comprises:

a cut formed in a leading end of said hollow boss portion of said piston; and positioning parts for effecting a positioning between said cut and the shaft of said supporting member when assembled.

3. A friction roller type continuously variable transmission as claimed in claim 2, in which said positioning parts comprise:

a reduced extension extending from the lower end of the shaft of said supporting member, said reduced extension having a non-circular cross section;

a pawl washer having a pawl and a non-circular opening through which said reduced extension passes in such a manner as not to allow a rotational displacement of said pawl washer relative said reduced extension;

a fastening member for fastening said pawl washer to said reduced extension while having said pawl engaged with said cut.

4. A friction roller type continuously variable transmission as claimed in claim 3, in which said non-circular cross section is of a shape having parallel opposed side edges.

5. A friction roller type continuously variable transmission as claimed in claim 3, in which said fastening member is a nut which is engaged with an externally threaded portion of said reduced extension.

6. A friction roller type continuously variable transmission as claimed in claim 2, further comprising:

a precess cam; and a fastening member for fastening said precess cam to a lower portion of the shaft of said supporting member.

7. A friction roller type continuously variable transmission as claimed in claim 6, in which said positioning parts comprise:

a semicircular key recess formed at a cylindrical outer wall of the shaft of said supporting member;

an axially extending key groove formed at a cylindrical inner wall of said precess cam, said key groove facing said key recess and aligning with said cut when the positioning parts are properly assembled; and a sunk key engaged with said key recess, said key groove and said cut.

8. A friction roller type continuously variable transmission as claimed in claim 6, in which said positioning parts comprise:

an axially extending key recess formed at a cylindrical outer wall of the shaft of said supporting member;

an axially extending key groove formed at a cylindrical inner wall of said precess cam, said key groove facing said key recess and aligning with said cut when the positioning parts are properly assembled; and a sliding key engaged with said key recess, said key groove and said cut.

9. A friction roller type continuously variable transmission as claimed in claim 6, in which said positioning parts comprise:

a reduced extension extending from the lower end of the shaft of said supporting member, said reduced extension having a non-circular cross section;

a pawl washer having a pawl and a non-circular opening through which said reduced extension passes in such a manner as not to allow a rotational displacement of said pawl washer relative to said reduced extension, said pawl being engaged with said cut;

an axially extending key recess formed at a cylindrical outer wall of the shaft of said supporting member;

an axially extending key groove formed at a cylindrical inner wall of said precess cam, said key groove facing said key recess when the positioning parts are properly assembled; and a sliding key engaged with said key recess and said key groove.

10. A friction roller type continuously variable transmission as claimed in claim 6, in which said precess cam is of a split type which comprises:

an upper part having a hollow portion; and a lower part having a circular recess.

11. A friction roller type continuously variable transmission as claimed in claim 10, in which said positioning parts comprise:

an axially extending key recess formed at a cylindrical outer wall of the shaft of said supporting member;

an axially extending key groove formed at a cylindrical inner wall of the hollow portion of the upper part of said precess cam, said key groove facing said key recess and aligning with said cut when the positioning parts are properly assembled;

a sliding key engaged with said key recess, said key groove and said cut; and a reduced extension extending from the lower end of the shaft of said supporting member, said reduced extension having a non-circular cross section; and a non-circular opening formed in the lower part of said precess cam, through which said reduced extension passes in such a manner as not to allow a rotational displacement of said lower part relative to said reduced extension.

12. A friction roller type continuously variable transmission as claimed in claim 10, in which said positioning parts comprise:

a reduced extension extending from the lower end of the shaft of said supporting member, said reduced extension having a non-circular cross section;

a pawl washer having a pawl and a non-circular opening through which said reduced extension passes in such a manner as not to allow a rotational displacement of said pawl washer relative to said reduced extension, said pawl being engaged with said cut;

an axially extending key recess formed at a cylindrical outer wall of the shaft of said supporting member;

an axially extending key groove formed at a cylindrical inner wall of the hollow portion of the upper part of said precess cam, said key groove facing said key recess when the positioning parts are properly assembled;

a sliding key engaged with said key recess and said key groove; and a non-circular opening formed in the lower part of said precess cam, through which said reduced extension passes in such a manner as not to allow a rotational displacement of said lower part relative to said reduced extension.

* * * * *